E. H. SCHWARTZBURG.
FEED AND WATER FOUNTAIN FOR POULTRY.
APPLICATION FILED MAR. 3, 1913.
1,107,206.
Patented Aug. 11, 1914.
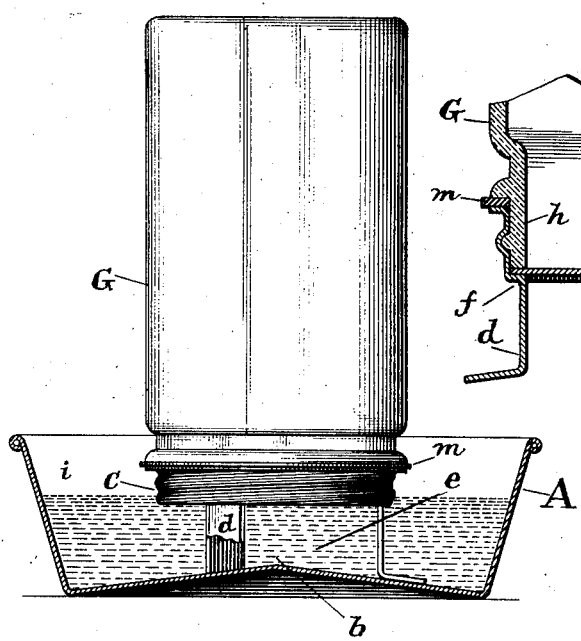
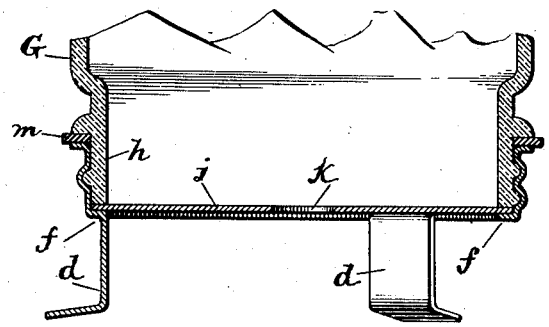
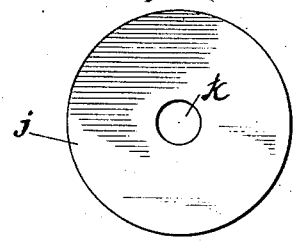
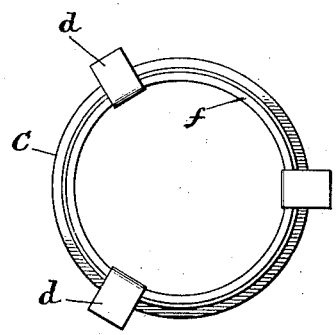
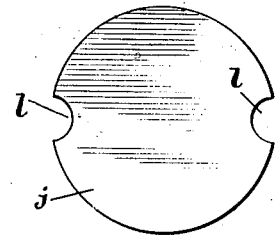
Witnesses
Edwin L. Bradford
G. Ferd. Vogt
Inventor
E. H. Schwartzburg
By Mann &Co
Attorneys

UNITED STATES PATENT OFFICE.

EDWARD H. SCHWARTZBURG, OF MILWAUKEE, WISCONSIN, ASSIGNOR TO NATIONAL ENAMELING AND STAMPING COMPANY, OF BALTIMORE, MARYLAND, A CORPORATION OF NEW JERSEY.

FEED AND WATER FOUNTAIN FOR POULTRY.

1,107,206.     Specification of Letters Patent.     Patented Aug. 11, 1914.

Application filed March 3, 1913. Serial No. 751,673.

*To all whom it may concern:*

Be it known that I, EDWARD H. SCHWARTZBURG, a citizen of the United States, residing at Milwaukee, in the county of Milwaukee and State of Wisconsin, have invented certain new and useful Improvements in Feed and Water Fountains for Poultry, of which the following is a specification.

This invention relates to an improvement in automatic fountain devices for supplying to poultry either dry granulated food, or water.

In Letters Patent of the United States No. 727,597 dated May 12, 1903, a device is shown and described for supplying water for poultry. This patent shows a glass jar inverted as a storage receptacle for water, but is not adapted for supplying dry grain or granulated food.

The object of this invention is to so change the structure shown in the said patent that the improved or changed device may be used for supplying water to poultry as the former device did, and also used for supplying dry grained feed to poultry.

The structure comprising the operative parts of the improvement will first be described and then the invention will be pointed out in the claim.

In the accompanying drawing, Figure 1 is an elevation, the pan being in section. Fig. 2 is a vertical section of the neck of the jar, the open collar and feet. Fig. 3 is an inverted plan of the open collar. Fig. 4 is a plan of disk used with water. Fig. 5 is another view of the disk showing an alternate form of opening for passage of water.

The device includes a metal pan; a screw-neck glass jar such as an ordinary fruit jar; a removable disk having a hole or a notch, and a ring or screw-threaded collar attached rigidly within the said pan and adapted to receive the screw-neck of the glass jar. The metal pan, A, has flaring sides and the inner surface of its bottom is preferably convexed or higher at the center, $b$. Within the pan is a ring or open collar, C, screw-threaded and supported by feet, $d$, which latter are rigidly attached to the pan bottom. These feet sustain the said open ring or collar below the top edge of the flaring side of the pan but in a position where the lower edge of the ring is above the bottom of the pan, thus relatively large open spaces, $e$, are formed below the open ring and between the feet that support the ring. The ring or screw-collar, C, is without holes around its rim; it has an annular flange, $f$, which projects inwardly around its lower edge, which serves a purpose that will be presently described. The glass jar, G, when in operative position is inverted and its screw neck, $h$, is inserted into the open collar, C, and connected thereto by the thread. An annular trough, $i$, is formed between the ring-collar and flaring sides of the pan.

The parts thus far described are operative as a feeder where the feed is dry and granulated in form, such as grain.

To serve as a feeder for poultry the empty jar must first be filled with the grain, or dry granulated food of any described character and the mouth of the jar left entirely open; then the pan upside down should be placed on top of the jar and the open collar, C, of the pan connected with the screw-neck $h$, around the open mouth of the jar. Then the entire device—both the jar and the upside-down pan—should have its position reversed and the bottom of the jar be uppermost, whereupon the dry feed in the inverted jar will flow down through the open collar onto the convex bottom of the pan and the feed will spread outwardly through the open spaces, $e$, and into the annular trough, $i$. The fowls may readily eat the feed from the trough without producing dirt or waste.

The feeder device just described is not operative as an automatic water-fountain for fowls because the inverted glass jar having its large mouth entirely open, would spill out and waste all, or nearly all, of the water contained in the jar when the reversal movement of both jar and pan should be made.

To convert the feeder device just described into an automatic water fountain, I provide the disk, $j$, having either a hole, $k$, as shown in Fig. 4, or as an alternative construction, having one or more notches, $l$, formed at the rim of the disk, as shown in Fig. 5. This disk has the size that will lie on and cover the open mouth of the glass jar; the disk must be placed loosely in the open ring or collar, C, and rested on the annular flange, $f$. When the jar has been filled with water and stands with its open mouth upward the pan with ring or collar and the said disk therein, these latter at this moment being in an upside-down position, should be placed on top of the jar, and the open collar connected with the screw-neck, h, of the jar. The disk will then have position between the mouth-edge of the jar and the said annular flange, f, of the open collar. Then the jar and upside-down pan may be reversed to bring the jar-bottom uppermost, and when making this reverse movement the water contained in the jar will not spill out or be wasted. When the jar-bottom is uppermost and the disk, j, is in position the water will pass down through the hole, k, or through the notch, l, which ever is used, and into the pan; the water in the jar will thus pass out until it rises in the pan high enough to seal the open mouth of the jar; the water will then cease passing out of the jar, and the supply of water in the trough, i, will be accessible to the fowls. A leather or rubber ring-washer, m, should be around the neck, h, of the jar and between the shoulder of the jar and the upper edge of the open collar, C, so as to make an air-tight connection when water is used.

Having thus described my invention what I claim and desire to secure by Letters Patent is:—

A feed and water fountain for poultry consisting of a pan open at the top; a threaded ring collar open at the top and bottom and at the bottom said collar having feet that are formed integrally with and depend from the lower edge of the collar; a disk in the collar at the upper ends of the integrally formed feet said disk having an opening therein, and a jar having a threaded engagement with the collar.

In testimony whereof I affix my signature in presence of two witnesses.

EDWARD H. SCHWARTZBURG.

Witnesses:
G. A. POHL,
EMIL H. WINTER.